United States Patent
Kim et al.

(10) Patent No.: US 9,628,218 B2
(45) Date of Patent: Apr. 18, 2017

(54) APPARATUS AND METHOD FOR SENDING AND RECEIVING CHANNEL STATE INFORMATION IN COMMUNICATION SYSTEM

(75) Inventors: Sung Tae Kim, Suwon-si (KR); Youn Sun Kim, Seongnam-si (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 166 days.

(21) Appl. No.: 13/582,201

(22) PCT Filed: Mar. 25, 2011

(86) PCT No.: PCT/KR2011/002077
§ 371 (c)(1),
(2), (4) Date: Aug. 31, 2012

(87) PCT Pub. No.: WO2011/122799
PCT Pub. Date: Oct. 6, 2011

(65) Prior Publication Data
US 2012/0320832 A1 Dec. 20, 2012

(30) Foreign Application Priority Data
Mar. 29, 2010 (KR) .................. 10-2010-0027671

(51) Int. Cl.
*H04B 7/04* (2006.01)
*H04L 1/00* (2006.01)

(52) U.S. Cl.
CPC .......... *H04L 1/0026* (2013.01); *H04L 1/0029* (2013.01)

(58) Field of Classification Search
None
See application file for complete search history.

(56) References Cited

U.S. PATENT DOCUMENTS

2009/0109873 A1* 4/2009 Shen et al. .................... 370/254
2009/0129330 A1 5/2009 Kim et al.
(Continued)

FOREIGN PATENT DOCUMENTS

EP 2164201 3/2010
KR 1020070107577 11/2007
(Continued)

OTHER PUBLICATIONS

3GPP "Remaining Issues on UE feedback", TSG RAN WG1 Meeting #53 R1-081821, May 2008, pp. 1-4.
(Continued)

*Primary Examiner* — Ajay Cattungal
*Assistant Examiner* — Ayanah George
(74) *Attorney, Agent, or Firm* — The Farrell Law Firm, P.C.

(57) ABSTRACT

The present invention relates to a channel status information transmission/reception method and apparatus in a wireless communication system in which the transmission apparatus generates channel status informations for at least two transmission schemes by combining rank informations corresponding to the transmission schemes into combined rank information through analyzing an uplink channel, and transmits the channel status informations for the respective transmission schemes on uplink channel, the channel status information for one of the transmission schemes containing the combined rank information; the reception apparatus receives the channel status informations corresponding to at least two transmission schemes, the channel status information for one of the transmission schemes including combined rank information for the transmission schemes, schedules downlink channel according to the channel status information, and transmits signals on the downlink channel. According to the present invention, the transmission apparatus combines rank informations of a plurality of transmission schemes and feeds back the combined rank information so as to reduce overhead at a reception apparatus.

13 Claims, 14 Drawing Sheets

(56) References Cited

U.S. PATENT DOCUMENTS

| | | | |
|---|---|---|---|
| 2009/0262695 A1* | 10/2009 | Chen | H04L 5/0053 |
| | | | 370/329 |
| 2009/0323849 A1* | 12/2009 | Bala | H04B 7/0417 |
| | | | 375/267 |
| 2010/0097949 A1 | 4/2010 | Ko et al. | |
| 2011/0142147 A1* | 6/2011 | Chen | H04L 25/03343 |
| | | | 375/260 |
| 2011/0200131 A1* | 8/2011 | Gao | H04B 7/0452 |
| | | | 375/267 |

FOREIGN PATENT DOCUMENTS

| | | |
|---|---|---|
| KR | 1020080073187 | 8/2008 |
| WO | WO 2008097041 | 8/2008 |

OTHER PUBLICATIONS

PCT/ISA/210 Written Opinion issued on PCT/KR2011/002077 (pp. 3).

PCT/ISA/237 Search Report issued on PCT/KR2011/002077 (pp. 4).

Korean Office Action dated Jun. 15, 2016 issued in counterpart application No. 10-2010-0027671, 4 pages.

\* cited by examiner

APPARATUS AND METHOD FOR SENDING AND RECEIVING CHANNEL STATE INFORMATION IN COMMUNICATION SYSTEM

TECHNICAL FIELD

The present invention relates to a communication method and apparatus in a mobile communication system.

BACKGROUND ART

The conventional voice telephony-oriented mobile communication systems have been evolved to high speed, high quality packet data-oriented mobile communication system for providing data and multimedia services. In order to support such high speed high quality data transmission services, various mobile communication technologies including $3^{rd}$ Generation Partnership Project (3GPP) High Speed Packet Access (HSPA) and LTE, 3GPP2 High Rate Packet Date (HRPD) and Ultra Mobile Broadband (UMB), and IEEE 802.16e have been developed.

The current $3^{rd}$ generation wireless packet data communication systems such as HSDPA, HSUPA, and HRPD use the Adaptive Modulation and Coding (AMC) and channel sensitive scheduling techniques for improving transmission efficiency. With the AMC technique, the transmitter can control the transmission data amount according to the channel condition. That is, the transmitter reduces the transmission data amount to maintain the reception error probability to an intended level when the channel condition is bad and increases the transmission data amount when the channel condition is good to transmit large amount of data while maintaining the reception error probability to an intended level. With the channel sensitive scheduling resource management technique, the transmitter serves the user having good channel status selectively among multiple users so as to increase system capacity as compare to the case allocating the channel to a single user for the service. Such system capacity increase is called multiuser diversity gain. The AMC and channel sensitive scheduling technique is a method for applying most efficient modulation and coding scheme at time for data transmission based on the partial channel status information fed back from the receiver.

DISCLOSURE OF INVENTION

Technical Problem

However, since the channel status information is received from multiple receivers in the mobile communication system, there is a problem in that the transmitter experience overhead. There is therefore a need to mitigate the overhead of the channel status information.

Solution to Problem

The present invention has been made in view of the above problems, and provides an apparatus and a method for sending and receiving channel state information in a communication system.

In accordance with an aspect of the present invention, a method for transmitting channel status information in a wireless communication system, includes: generating channel status informations for at least two transmission schemes by combining rank informations corresponding to the transmission schemes into combined rank information through analyzing an uplink channel; and transmitting the channel status informations for the respective transmission schemes on uplink channel, the channel status information for one of the transmission schemes containing the combined rank information.

In accordance with another aspect of the present invention, a method for receiving channel status information in a wireless communication system, includes: receiving the channel status informations corresponding to at least two transmission schemes, the channel status information for one of the transmission schemes including combined rank information for the transmission schemes, scheduling downlink channel according to the channel status information, and transmitting signals on the downlink channel.

In accordance with another aspect of the present invention, a transmission apparatus includes: a channel analyzer for analyzing downlink channel; a feedback information generator for generating channel informations for at least two transmission schemes according to downlink channel analysis result, the channel status information for one of the transmission schemes including combined rank information for the transmission schemes, and a transmitter for feeding back the channel status informations by transmitting the combined rank information through one of the transmission schemes on uplink channel.

In accordance with another aspect of the present invention, a reception apparatus includes: a receiver for receiving channel status informations corresponding to at least two transmission schemes, the channel status information for one of the transmission schemes including combined rank information for the transmission schemes, a scheduler for scheduling the downlink channel according to the channel status informations, and a transmitter for transmitting signals on the downlink channel under the control of the scheduler.

Advantageous Effects of Invention

Accordingly, the channel status information transmission/reception method and apparatus in a mobile communication allows the transmission apparatus to perform feedback with the combined rank information for a plurality of transmission schemes, resulting in reduction of overhead in the reception apparatus.

BRIEF DESCRIPTION OF DRAWINGS

The objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Although the description is directed to the wireless communication system based on OFDM (Orthogonal Frequency Division Multiplexing), especially the 3GPP EUTRA (Evolved UMTS Terrestrial Radio Access) standard in the embodiments of the present invention, the subject matter of the present invention can be applied to other communication systems having similar technical background and channel types without departing from the scope of the present invention, and this is obvious to those skilled in the art.

In the present invention, the base station needs the downlink channel status information of the terminals for the link adaptive transmission of the terminals in downlink of the wireless communication system. The terminal generates the channel status information based on the reference signal received on downlink channel and feeds back the channel status information to the base station in uplink control channel. The feedback information includes Rank Indicator (RI), Channel Quality Indicator (CQI), and Precoding Matrix Indicator (PMI). The RI, CQI, and PMI are referenced by the base station for determining whether to use the rank-restricted transmission scheme (e.g., MU-MIMO transmission in 3GPP LTE-A) or the rank-unrestricted transmission scheme (e.g., SU-MIMO transmission in 3GPP LTE-A), such that the terminal has to feed back both the channel information for the rank-restricted transmission scheme and the channel information for the rank-unrestricted transmission scheme.

A description is made of the feedback method and apparatus according to the embodiments of the present invention.

Figure 1:
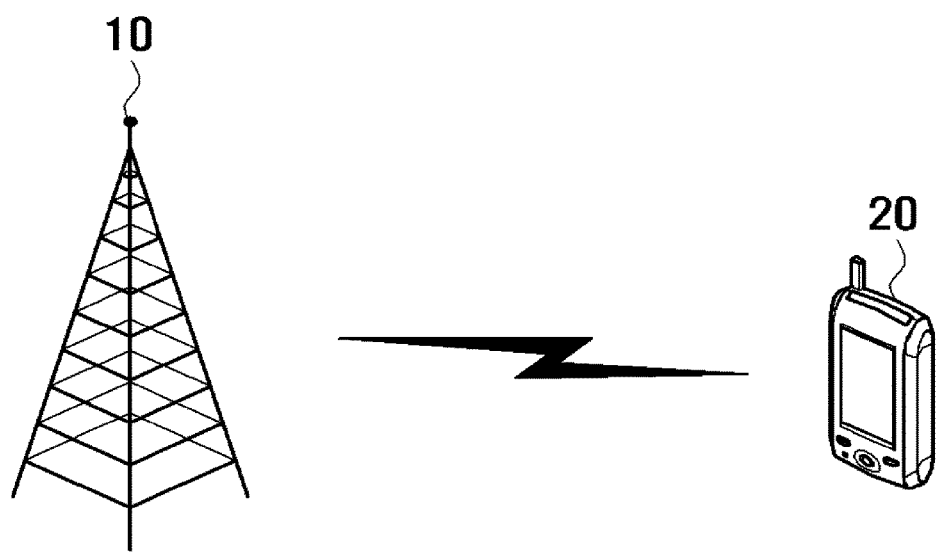
FIG. 1 is a block diagram illustrating a configuration of a mobile communication system according to an embodiment of the present invention.

FIG. 1 is a block diagram illustrating the configuration of a mobile communication according to an embodiment of the present invention. The description is made under the assumption that the transmitter is a base station and the receiver is a user terminal.

Referring to FIG. 1, the mobile communication system according to this embodiment includes a base station 10 and a terminal 20. The base station 10 provides a communication service. That is, the base station 10 performs scheduling to allocate downlink and uplink channels. The base station 10 transmits Reference signals and data on downlink channels. The terminal 20 uses the communication service. That is, the terminal 20 checks the downlink channel with the reference signals. The terminal 20 also feeds back the channel status information of the downlink channel to the base station 10.

A description is made of the channel status information feedback method according to the first embodiment of the present invention with reference to FIGS. 2 to 5. Although the description is directed to the feedback method for the rank-restricted transmission scheme and rank-unrestricted transmission scheme, the present invention is not limited thereto.

Figure 2:
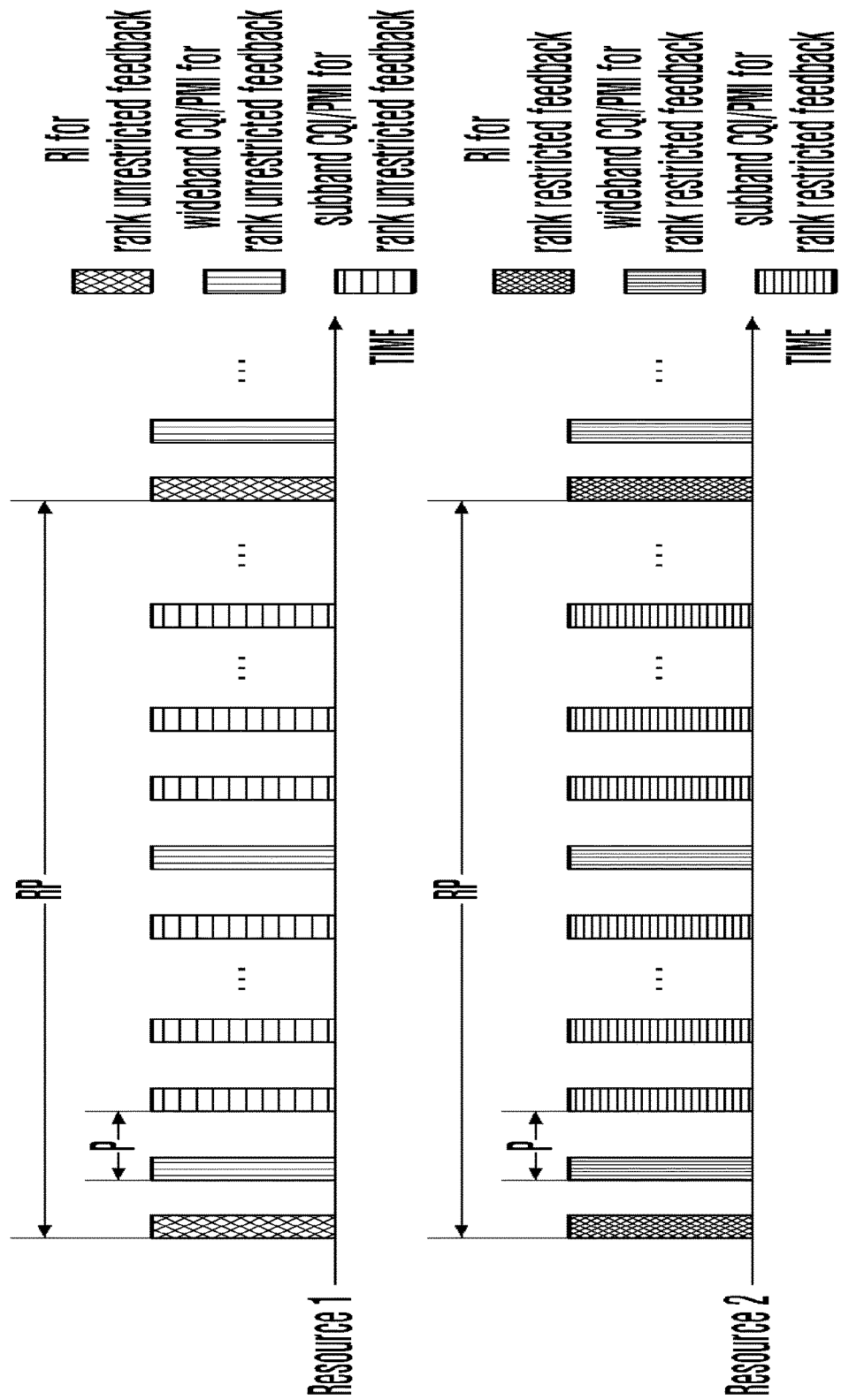
FIG. 2 is an exemplary diagram for illustrating a feedback method for rank-restricted transmission scheme and rank-unrestricted transmission scheme according to a first example in the first embodiment of the present invention.

FIG. 2 is a diagram illustrating a channel status information feedback method for uplink channel according to the first example in the mobile communication system supporting both the rank-restricted transmission scheme and rank-unrestricted transmission scheme.

Referring to FIG. 2, although the channel status information for the rank-restricted transmission scheme and the channel status information for the rank-unrestricted transmission scheme are transmitted simultaneously but fed back on the different resources of uplink channel. Each of both the channel status information for the rank-restricted transmission scheme and the channel status information for the rank-unrestricted transmission scheme includes RI, subband CQI/PMI, and wideband CQI/PMI. Here, the RI is fed back at an interval of RP, and the transmission interval between the wideband CQI/PMI and the subband CQI/PMI is P, however, the subband CQI/PMI is transmitted more frequently as compared to the wideband CQI/PMI. At this time, the time durations for the rank-restricted transmission scheme and the rank-unrestricted transmission scheme are identical with each other and each of the times durations is arranged periodically. The same type of channel status information is fed back for the rank-restricted transmission scheme and rank-unrestricted transmission scheme for the same duration. For example, in the time duration for transmitting the subband CQI/PMI for the rank-unrestricted transmission scheme, the subband CQI/PMI for the rank-restricted transmission scheme can be fed back. Also, different types of channel status information can be fed back for the rank-unrestricted transmission scheme and the rank-restricted transmission scheme in the same time duration.

For example, in the time duration for transmitting the subband CQI/PMI for the rank-unrestricted transmission scheme, the subband CQI/PMI for the rank-restricted transmission scheme can be fed back.

Figure 3:
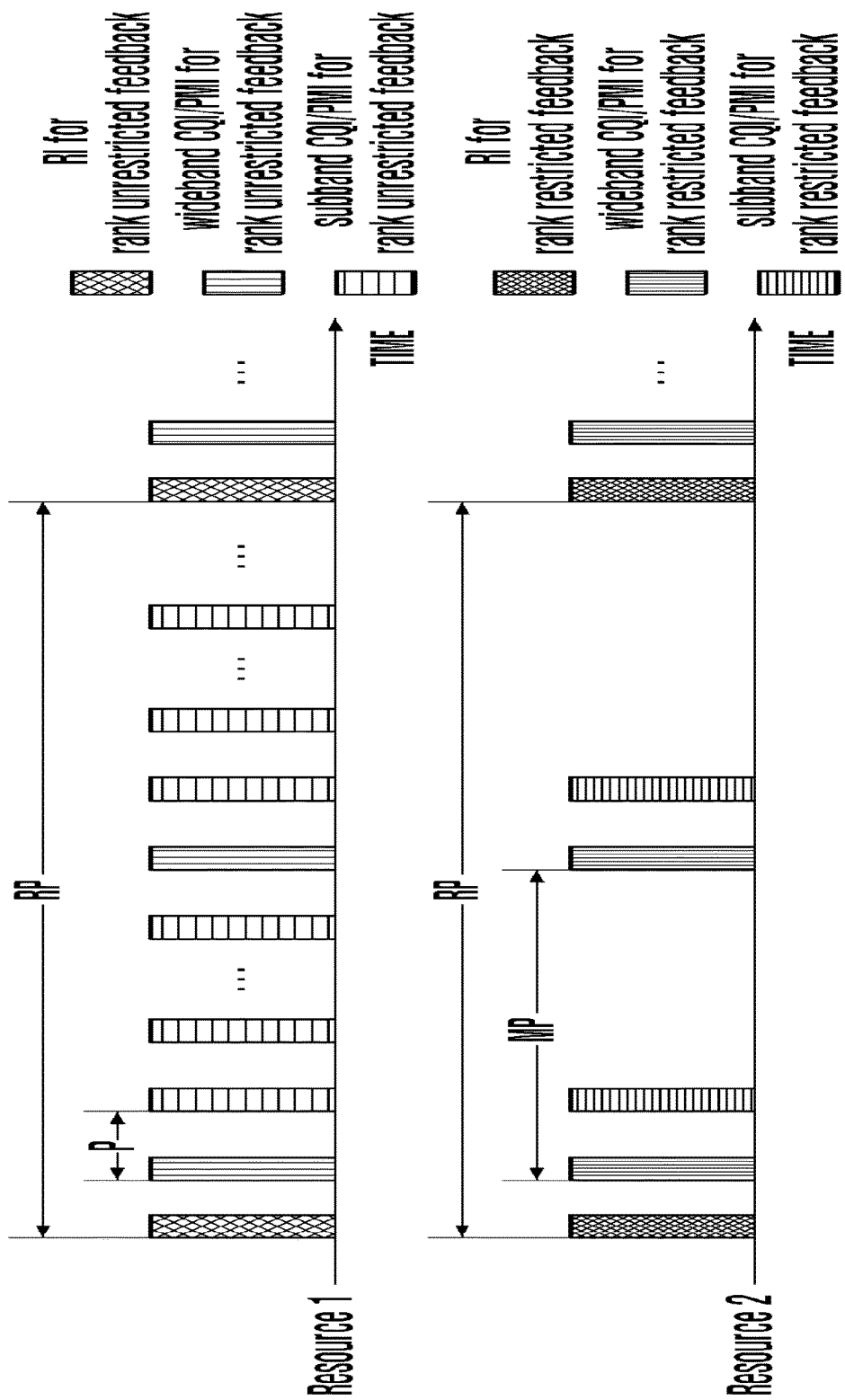
FIG. 3 is an exemplary diagram for illustrating a feedback method for rank-restricted transmission scheme and rank-unrestricted transmission scheme according to a second example in the first embodiment of the present invention.

FIG. 3 is a diagram illustrating channel status information feedback method for uplink channel according to the second example in the mobile communication system supporting both the rank-restricted transmission scheme and rank-unrestricted transmission scheme.

Referring to FIG. 3, the feedback of the channel status information for the rank-non-restricted transmission scheme is same as the example described with reference to FIG. 1. Nevertheless, the transmission interval of the channel status information feedback for the rank-restricted transmission scheme, i.e. MP, can differ from the P described with reference to FIG. 1. That is, the transmission interval of the channel status information for the rank-restricted transmission scheme can be longer or shorter than that of the rank-unrestricted transmission scheme. At this time, the time durations for the rank-unrestricted transmission scheme and the rank-restricted transmission scheme on the uplink channel are identical with each other and arranged periodically. In this manner, both the channel status information of the rank-unrestricted transmission scheme and channel status information of the rank-restricted transmission scheme can be fed back in the same time duration. Also, the channel status information of one of both the rank-unrestricted transmission scheme and rank-restricted transmission scheme is fed back while the channel status information of the other is not transmitted.

Figure 4:
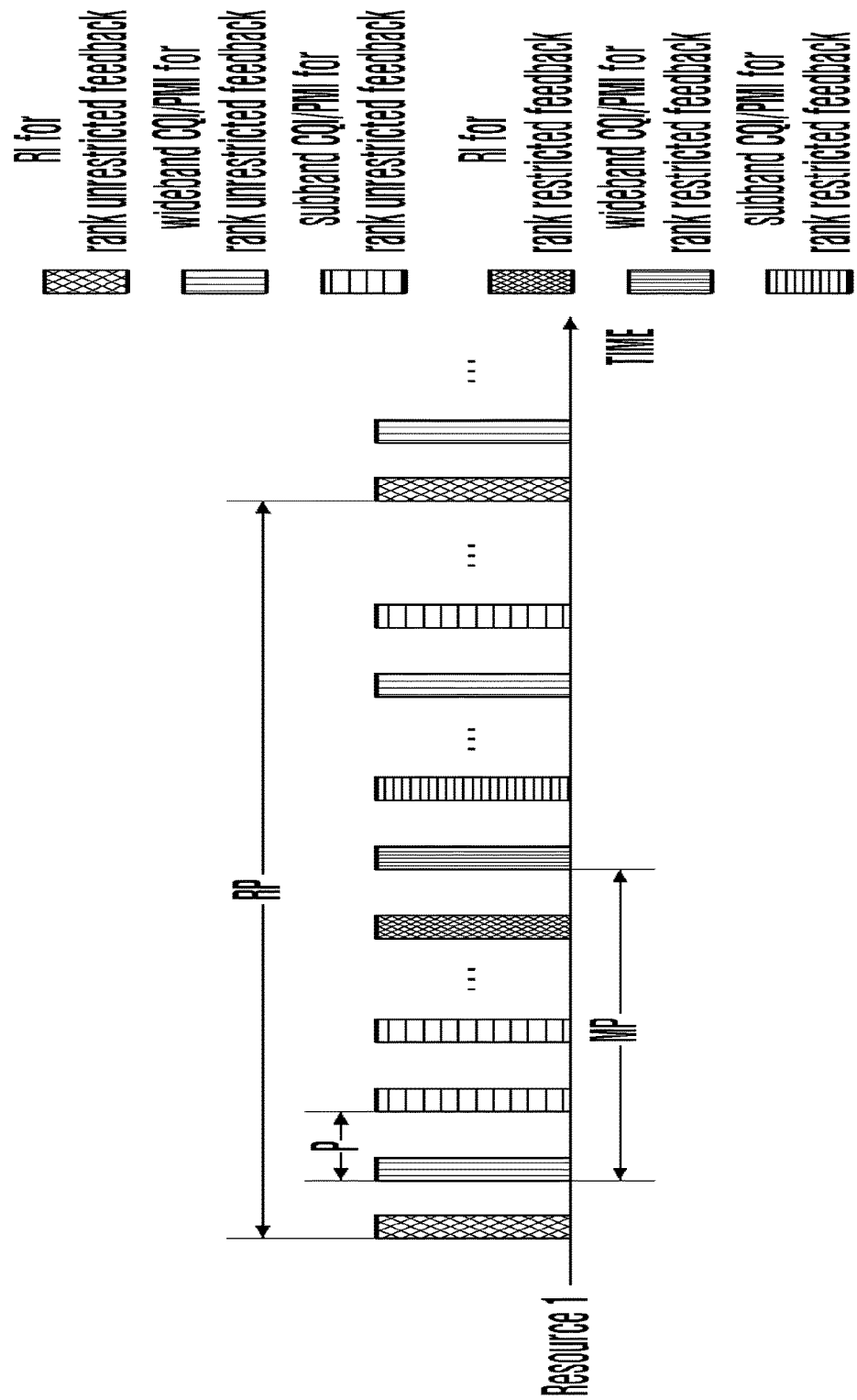
FIG. 4 is an exemplary diagram for illustrating a feedback method for rank-restricted transmission scheme and rank-unrestricted transmission scheme according to a third example in the first embodiment of the present invention.

FIG. 4 is a diagram illustrating channel status information feedback method according to the third example in the mobile communication system supporting both the rank-restricted transmission scheme and rank-unrestricted transmission scheme.

Referring to FIG. 4, unlike the examples described with reference to FIGS. 1 and 2, the channel status information feedback for both the rank-restricted transmission scheme and rank-unrestricted transmission schemes are performed on one uplink channel resource. The feedbacks of channel status information for the rank-restricted transmission scheme and the channel status information feedback for the ran-unrestricted transmission scheme are transmitted at their individual transmission intervals that are different from each other. At this time, the time durations for the rank-restricted transmission scheme and the rank-unrestricted transmission scheme on the uplink channel are arranged periodically. In this manner, the channel status information of one of the rank-unrestricted transmission scheme and rank-restricted transmission scheme can be fed back.

Figure 5:
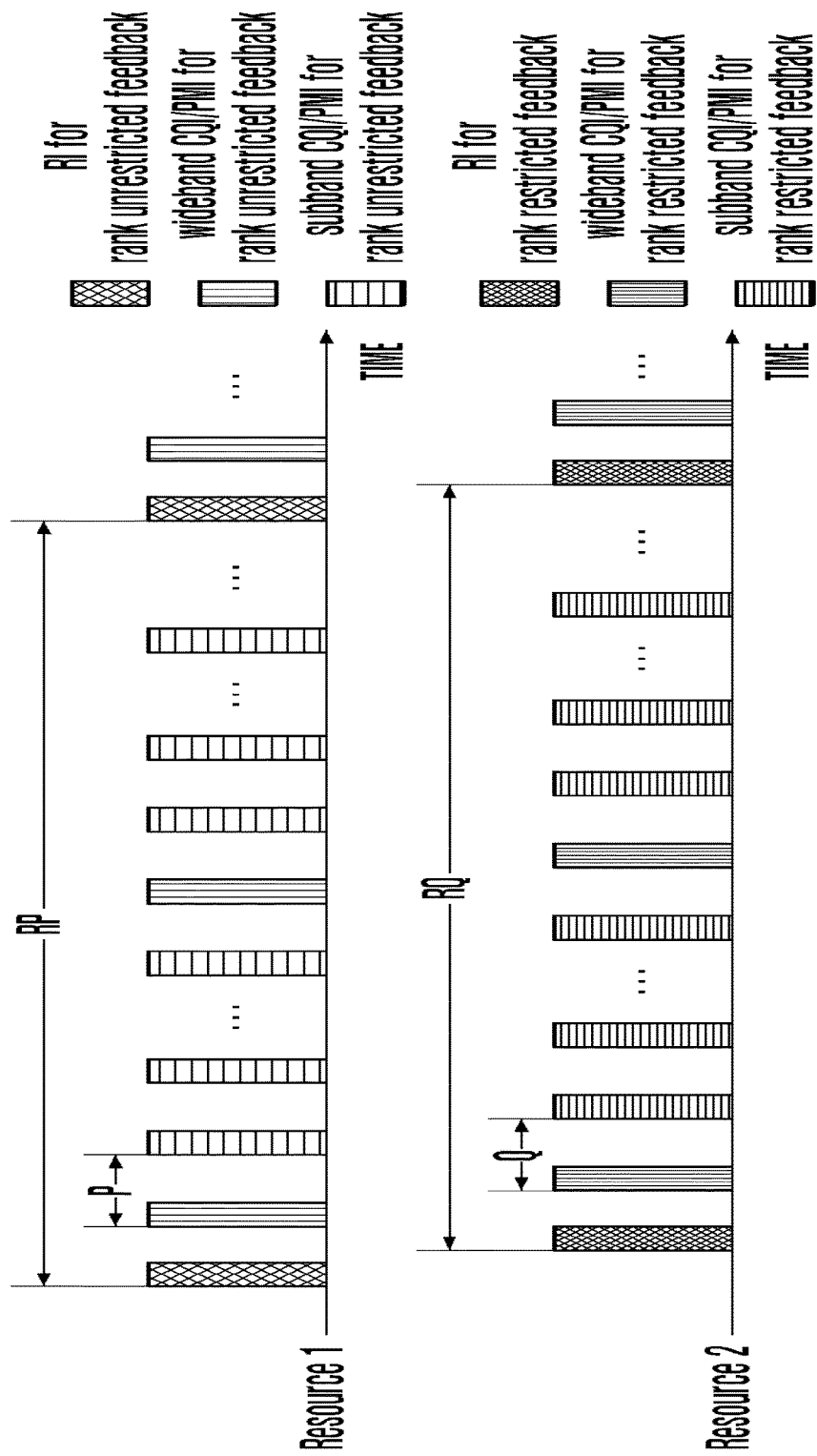
FIG. 5 is an exemplary diagram for illustrating a feedback method for rank-restricted transmission scheme and rank-unrestricted transmission scheme according to a fourth example in the first embodiment of the present invention.

FIG. 5 is a diagram illustrating channel status information feedback method according to the fourth example in the mobile communication system supporting both the rank-restricted scheme and rank-unrestricted transmission scheme.

Referring to FIG. 5, the time duration of the rank-unrestricted transmission scheme and the time duration of the rank-restricted transmission scheme differ from each other on uplink channel. At this time, the time durations of the rank-unrestricted transmission scheme and the rank-restricted transmission scheme can occupy different resources on the uplink channel. The time durations for the rank-restricted transmission scheme are arranged periodically, and the time durations for the rank-unrestricted transmission scheme are arranged periodically. The channel status information feedback interval for the rank-unrestricted transmission scheme and the channel status information feedback transmission scheme for the rank-restricted transmission scheme can differ from each other.

Furthermore, there can be other various types of examples for the channel status information feedback method according to the first embodiment of the present invention. The common factor of the channel status information feedback methods according to the first embodiment of the present invention is, when feeding back the channel status information for two different transmission schemes (e.g., MU-MIMO and SU-MIMO of 3GPP LTE-A) to transmit all of the channel status information of RI and CQI/PMI.

If it is possible to acquire the information on the channel status information for other transmission scheme from the channel status information feedback for another transmission scheme, this is advantageous as compared to the transmission of two different versions of channel status information in view of feedback overhead. That is, the method for acquiring the channel status information for a transmission scheme from the channel status information fed back for another transmission scheme is more efficient. Although both the channel status information for the rank-restricted transmission scheme and the channel status information for the rank-unrestricted transmission scheme are fed back in the first embodiment of the present invention, the rank information for the rank-restricted transmission scheme can acquired the RI feedback for the rank-unrestricted transmission method, such that there is a room for improvement in the present invention.

The second embodiment of the present invention proposes a channel status transmission/reception method and apparatus for acquiring the rank information for the rank-restricted transmission scheme form the RI fed back for the rank-unrestricted transmission scheme without feeding back the RI for the rank-restricted transmission scheme to reduce the feedback overhead in the cellular mobile communication system supporting both the rank-restricted transmission scheme and the rank-unrestricted transmission scheme.

The channel status information feedback method according to the second embodiment of the present invention is described with reference to FIGS. 6 to 10. Although the descriptions are made under the assumption of the feedback method for the rank-restricted transmission scheme and the rank-unrestricted transmission scheme, the present invention is not limited thereto.

Figure 6:
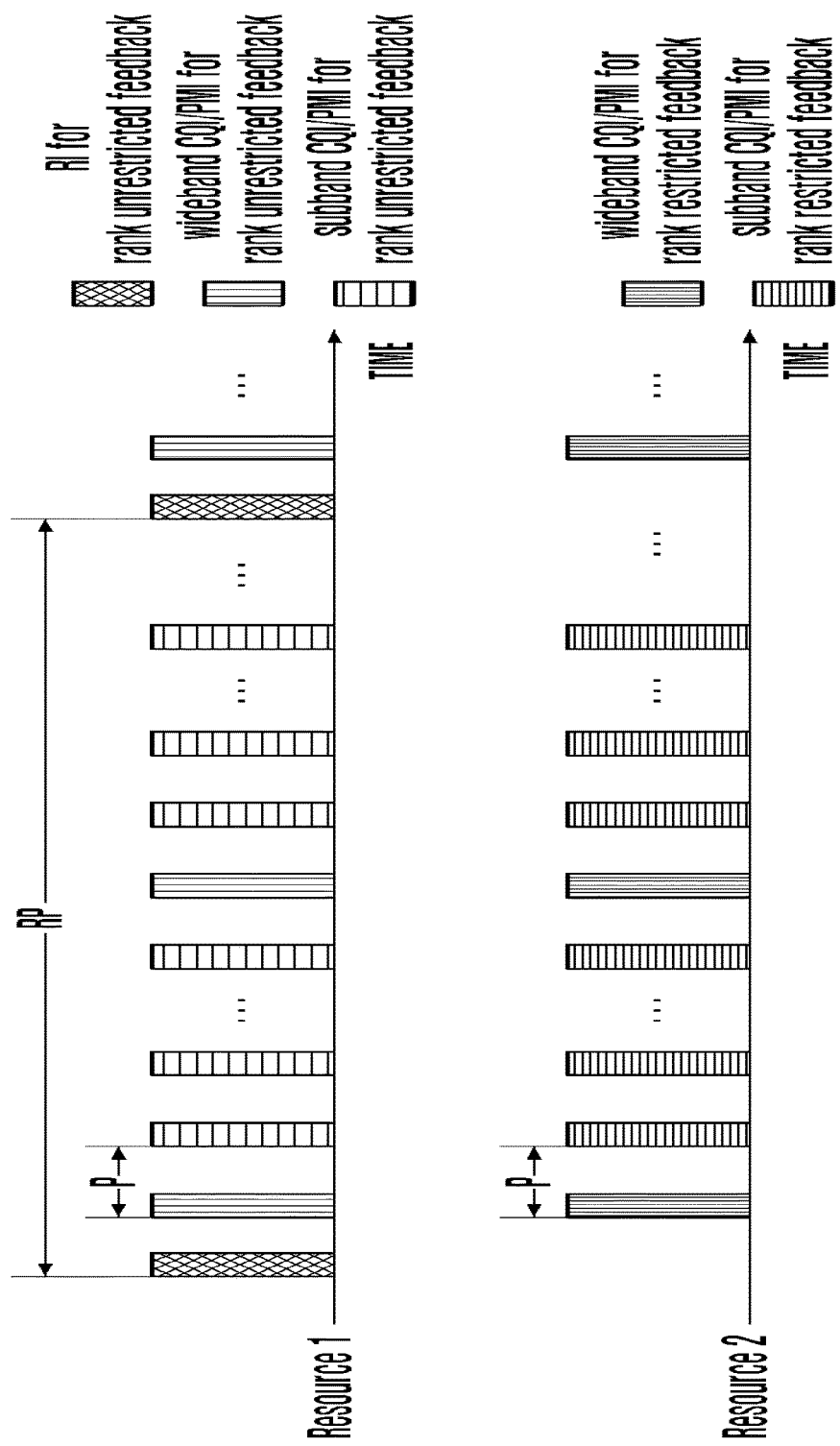
FIG. 6 is an exemplary diagram for illustrating a feedback method for rank-restricted transmission scheme and rank-unrestricted transmission scheme according to a first example in the second embodiment of the present invention.

FIG. 6 is a diagram illustrating channel status information feedback method according to the first example of the second embodiment of the present invention.

Referring to FIG. 6, in the present invention the RI, subband CQI/PMI, and wideband CQI/PMI for the rank-unrestricted transmission scheme are fed back and the subband CQI/PMI and wideband CQI/PMI for the rank-restricted transmission scheme. At this time, one of the subband CQI/PMI and wideband CQI/PMI for the rank-unrestricted transmission scheme and one of the subband CQI/PMI and wideband CQI/PMI for the rank-restricted transmission scheme are transmitted at the same timing. At the timing when the RI for the rank-unrestricted transmission scheme is fed back, the RI for the rank-restricted transmission scheme is not fed back. Accordingly, the rank information for the subband CQI/PMI and wideband CQI/PMI for the rank-restricted transmission scheme is acquired from the most recent RI fed back for the rank-unrestricted transmission scheme.

The RI for the rank-unrestricted transmission scheme is fed back at an interval of RP, and the subband CQI/PMIs and the wideband CQI/PMIs for the rank-unrestricted transmission scheme and rank-restricted transmission scheme are fed back at an interval of P respectively. Here, the wideband CQI/PMI is fed back more frequently than the subband CQI/PMI. The time durations for the rank-unrestricted transmission scheme and the rank-restricted transmission scheme are identical with each on uplink channel and arranged periodically. Also, the same time duration can be occupied for the same type channel status information for the rank-restricted transmission scheme and the rank-unrestricted transmission scheme. For example, in the time duration for the feedback of subband CQI/PMI for the rank-unrestricted transmission scheme, the subband CQI/PMI for the rank-restricted transmission scheme can be fed back. Also, the same time duration can be occupied for the transmission of the different type channel status information for the rank-unrestricted transmission scheme and the rank-restricted transmission scheme. For example, in the time duration for the feedback of subband CQI/PMI for the rank-unrestricted transmission scheme, the wideband CQI/PMI for the rank-restricted transmission scheme can be fed back.

Figure 7:
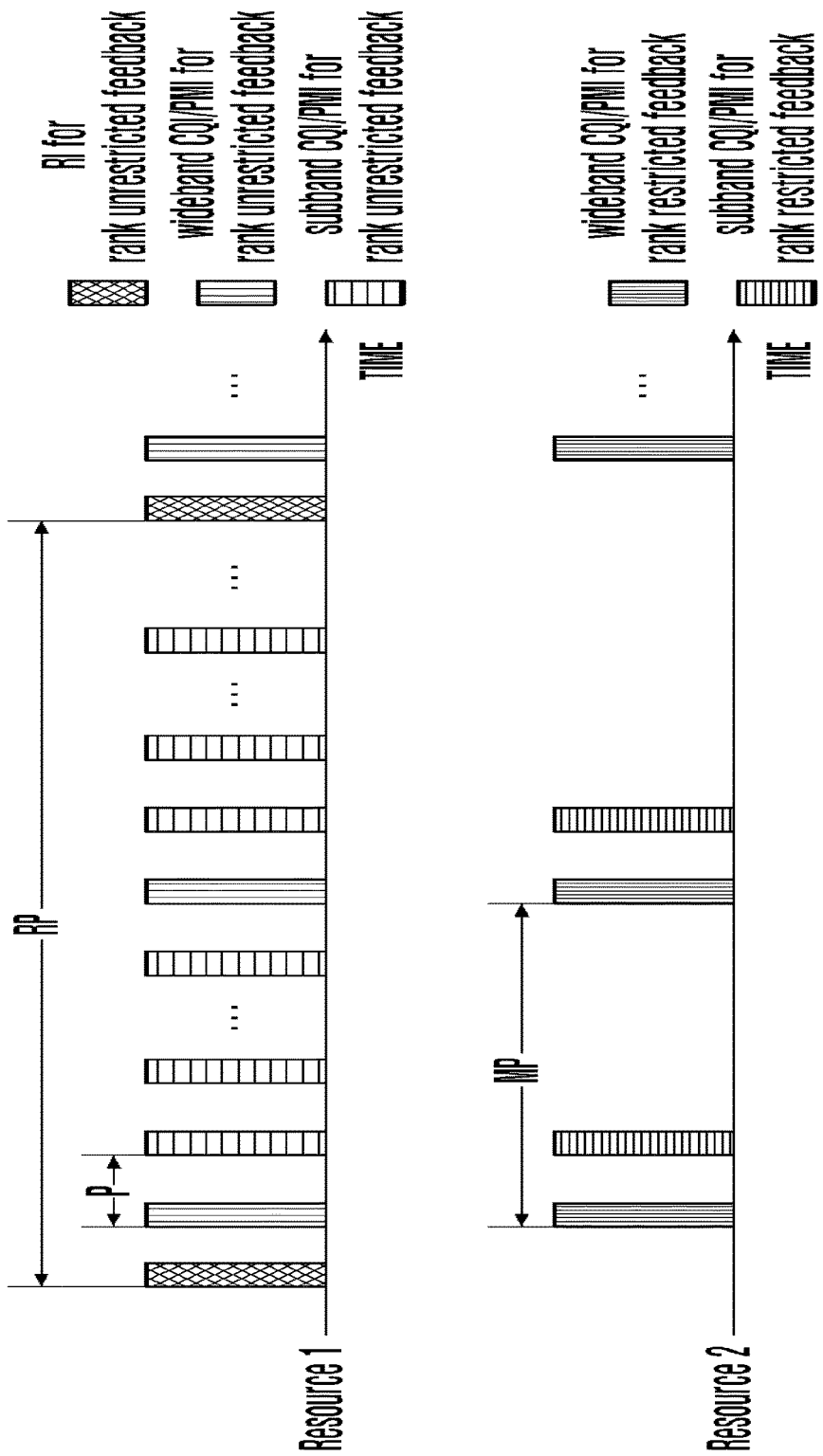
FIG. 7 is an exemplary diagram for illustrating a feedback method for rank-restricted transmission scheme and rank-unrestricted transmission scheme according to a second example in the second embodiment of the present invention.

FIG. 7 is a diagram illustrating the feedback method according to the second example of the second embodiment of the present invention.

Referring to FIG. 7, the channel status information feedback for the rank-unrestricted transmission scheme is same as the exemplary case described with reference to FIG. 6. However, the channel status feedback interval, i.e. MP, for the rank-restricted transmission scheme differs from the channel information feedback interval, i.e. P, for the rank-unrestricted transmission scheme. Similar to the previously described exemplary case, at the time when the RI for the rank-unrestricted transmission scheme is fed back, the RI for the rank-restricted transmission scheme is not fed back. As aforementioned, the rank information for the rank-restricted transmission scheme is acquired from the RI most recently fed back for the rank-unrestricted transmission scheme.

At this time, the time durations for the rank-unrestricted transmission scheme and the rank-restricted transmission scheme are identical with each other and arranged periodically on the uplink channel. In this manner, both the channel information for the rank-unrestricted transmission scheme and the channel status information for the rank-restricted transmission scheme are fed back in specific time duration. The channel status information of one of the rank-unrestricted transmission scheme and the rank-restricted transmission scheme can be fed back in other time duration while the channel information of the other is not fed back.

Figure 8:
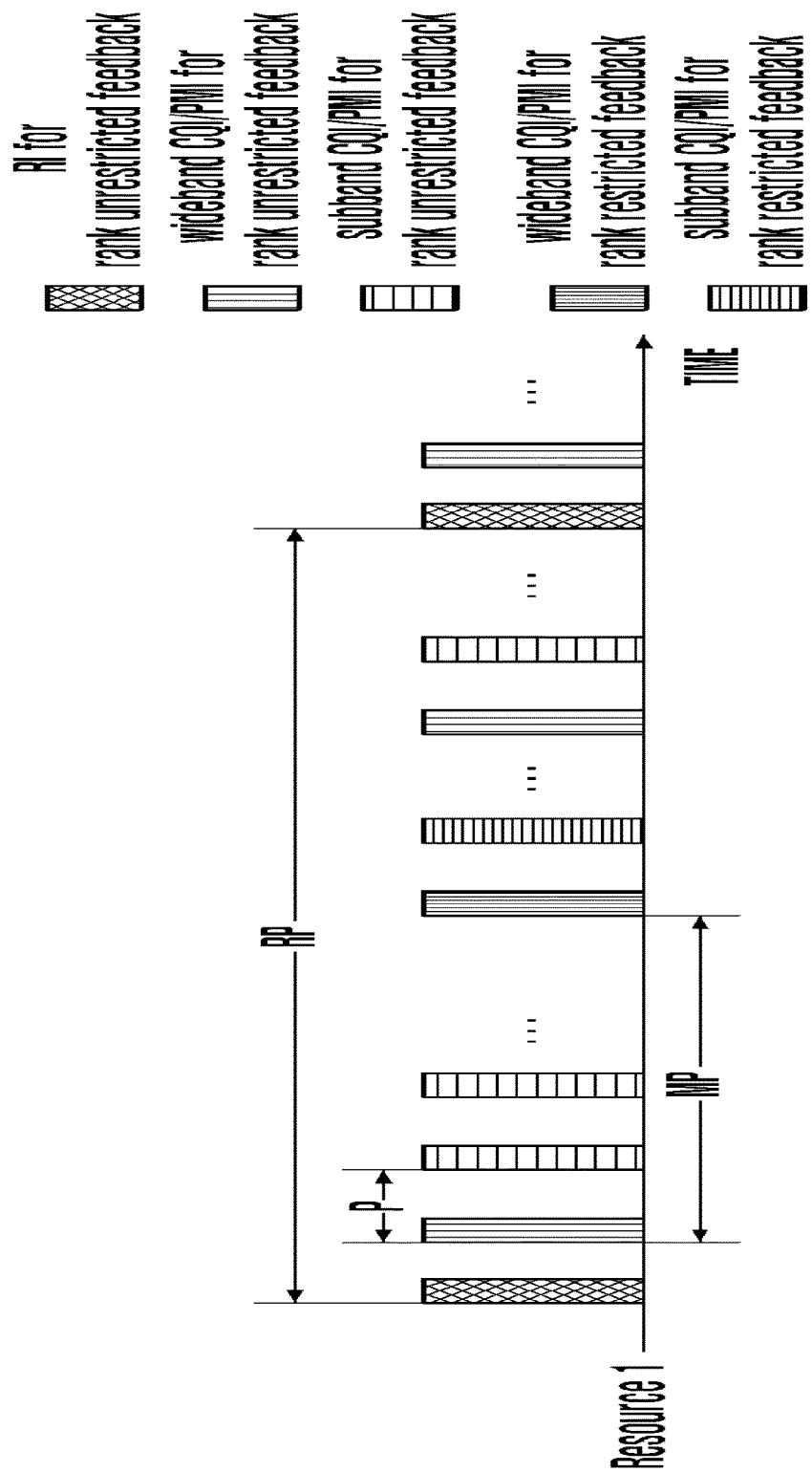
FIG. 8 is an exemplary diagram for illustrating a feedback method for rank-restricted transmission scheme and rank-unrestricted transmission scheme according to a third example in the second embodiment of the present invention.

FIG. 8 is a diagram illustrating a feedback method according to the third example of the second embodiment of the present invention.

Referring to FIG. 8, unlike the exemplary cases described with reference to FIGS. 6 and 7, the channel information feedback for the rank-restricted transmission scheme and the channel information feedback for the rank-unrestricted transmission scheme are both transmitted on a single uplink channel resource. However, similar to the aforementioned example, the RI for the rank-unrestricted transmission scheme is transmitted but not the RI for the rank-restricted transmission scheme is transmitted separately. As described above, the rank information for the rank-restricted transmission scheme is acquired from the RI most recently fed back for the rank-unrestricted transmission scheme. The time durations for the rank-unrestricted transmission scheme and the rank-restricted transmission scheme are arranged periodically on the uplink channel. In this manner, the channel information of one of the rank-unrestricted transmission scheme and the rank-restricted transmission scheme can be fed back in each time duration on the uplink channel.

Figure 9:
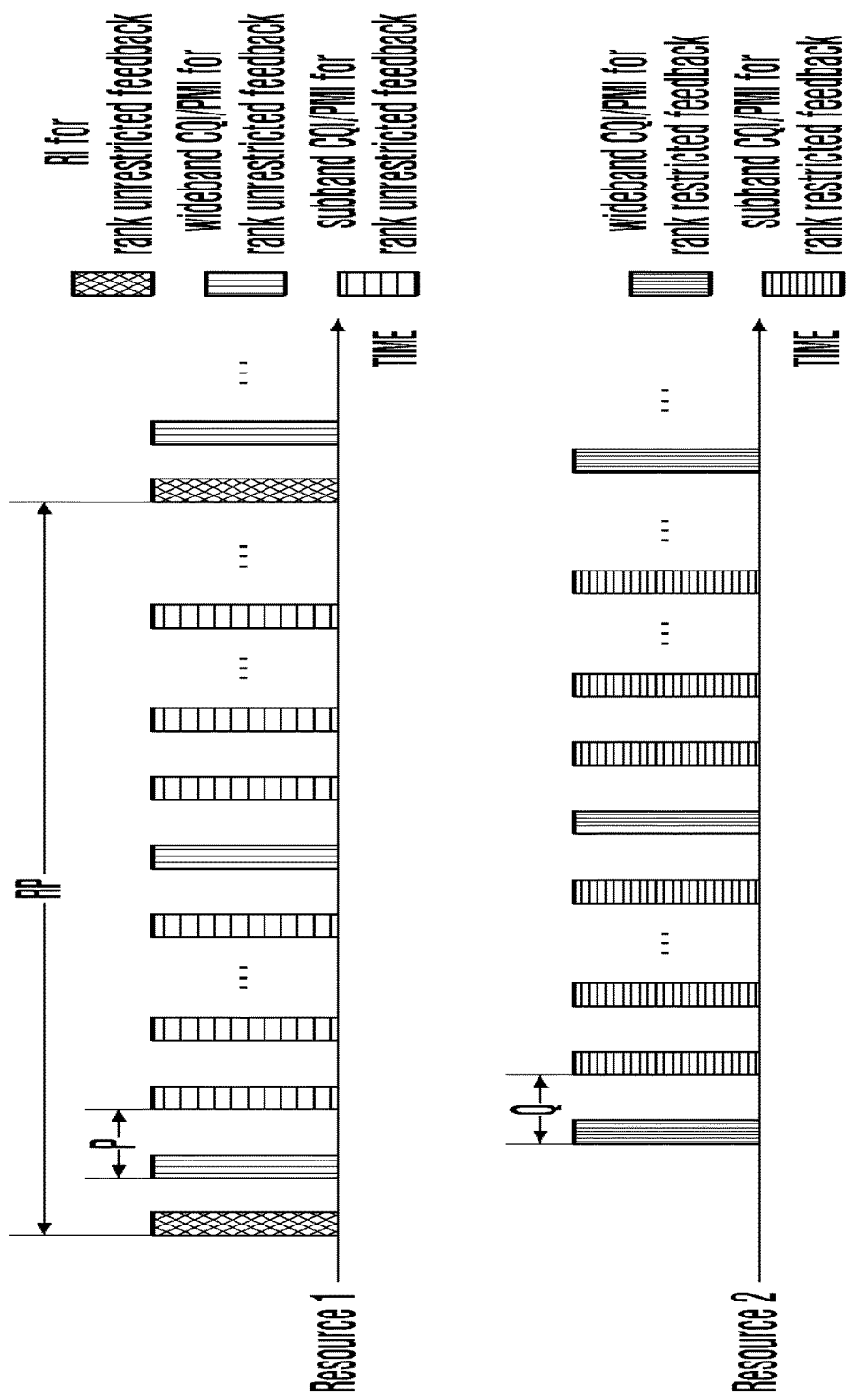
FIG. 9 is an exemplary diagram for illustrating a feedback method for rank-restricted transmission scheme and rank-unrestricted transmission scheme according to a fourth example in the second embodiment of the present invention.

FIG. 9 is a diagram illustrating the feedback method for the fourth example of the second embodiment of the present invention.

Referring to FIG. 9, unlike the aforementioned exemplary cases, the time duration for the rank-unrestricted transmission scheme and the time duration for the rank-restricted transmission scheme are different from each other on the uplink channel. The time duration of the rank-unrestricted transmission scheme and the time duration of the rank-restricted transmission scheme can occupy different resources on the uplink channel. The time durations for the rank-unrestricted transmission scheme are arranged periodically, and the time durations for the rank-restricted transmission scheme are arranged periodically. Also, the transmission interval of the channel status information feedback for the rank-restricted transmission scheme and the transmission interval of the channel status information feedback for the rank-unrestricted transmission scheme can be different from each other. However, the RI for the rank-restricted transmission scheme may not be transmitted as in the above described exemplary cases. Like the above-described exemplary cases, the rank information for the rank-restricted transmission scheme can be acquired from the RI most recently transmitted for the rank-unrestricted transmission scheme.

Although the above-described embodiments of the present invention are directed to the cases supporting both the rank-restricted transmission scheme and rank-unrestricted transmission scheme simultaneously, the present invention is not limited thereto. That is, the feedback method according to the second embodiment of the present invention can be generalized as shown in FIG. 10.

Figure 10:
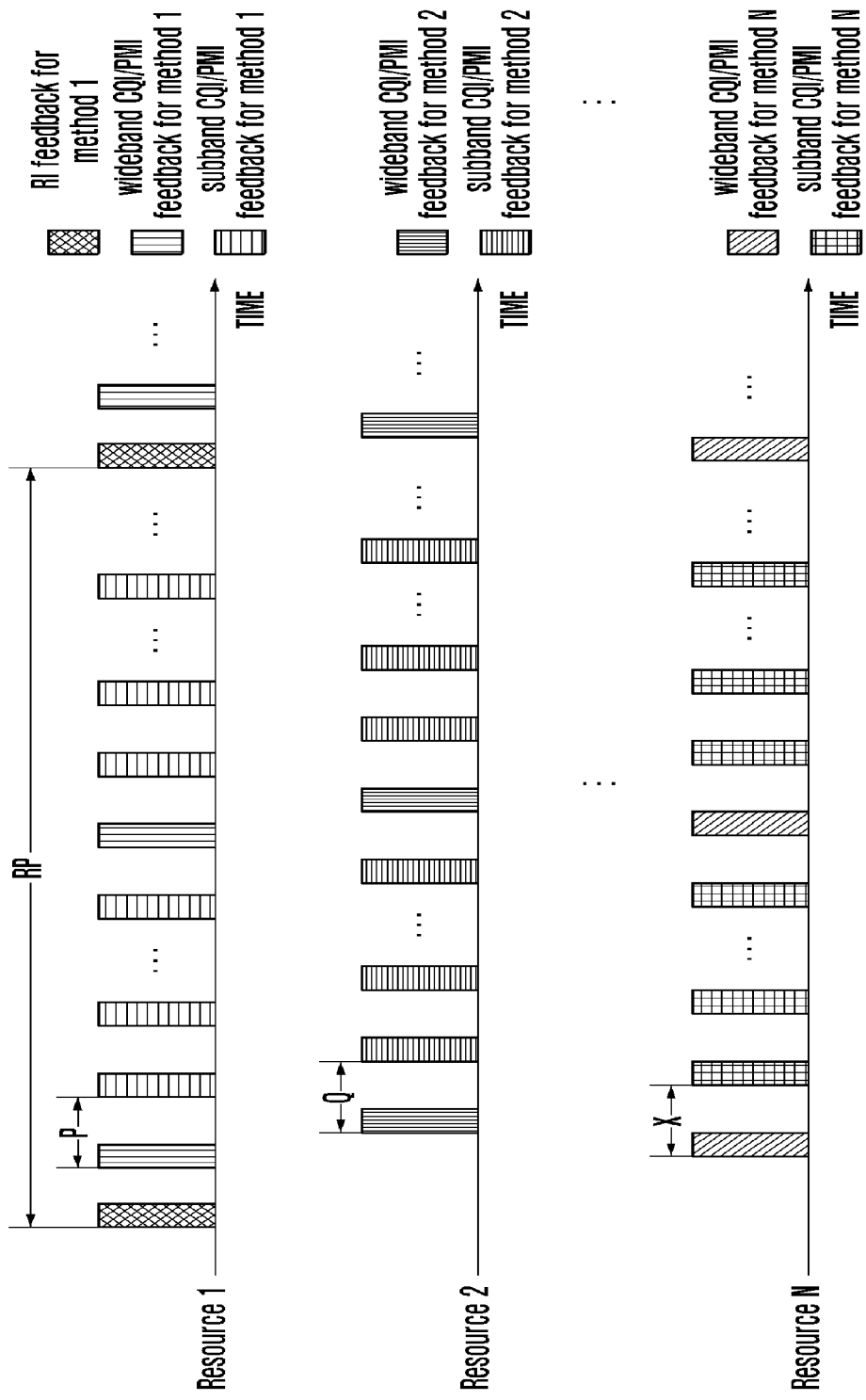
FIG. 10 is an exemplary diagram for illustrating the feedback method generalized according to the second embodiment of the present invention.

Referring to FIG. 10, the key issue of the feedback method according to the second embodiment of the present invention is, when two or more different transmission schemes are used, to feed back the rank information for one of the multiple transmission scheme such that the rank information for other transmission scheme is estimated from the received rank information. Although it is depicted that the channel status informations for the different transmission scheme occupy different uplink channel resources, the present invention encompasses the cases where the channel status informations for all the transmission schemes are transmitted in different time durations on the same uplink channel. In addition, the feedback method of the present invention can be applied regardless of whether there is the transmission scheme restricted in rank among the multiple transmission schemes or not and whether the transmission ranks supported by the multiple transmission schemes are identical with or different from each other. In such a case, however, it is preferred to feed back the RI of the transmission scheme supporting the highest transmission rank among the multiple transmission schemes.

In case that the feedback method according to the second embodiment of the present invention is applied, the RI of the transmission scheme supporting the highest transmission rank among the N transmission schemes. For the simplicity purpose, it is assumed that the transmission rank supported by the transmission scheme 1 is the highest one such that the RI for the transmission scheme 1 is fed back. In this case, the rank information for each of $2^{nd}, \ldots, N^{th}$ transmission schemes can be acquired from the RI fed back for the transmission scheme 1. The rank for each transmission scheme can be determined according to Math Figure 1:

MathFigure 1

$$R_n = \min(R_{nmax}, R_1), n=2, \ldots, N \qquad \text{[Math. 1]}$$

where $R_n$ is the channel rank for $n^{th}$ transmission scheme, and $R_{nmax}$ is the maximum rank supported by $n^{th}$ transmission scheme. The $R_1$ is the channel rank information acquired from the RI fed most recently back for the transmission scheme 1.

The CQIs/PMIs of the transmission schemes of which RIs are not fed back are determined and fed back in consideration of the rank acquired through the above-described process.

Figure 11:
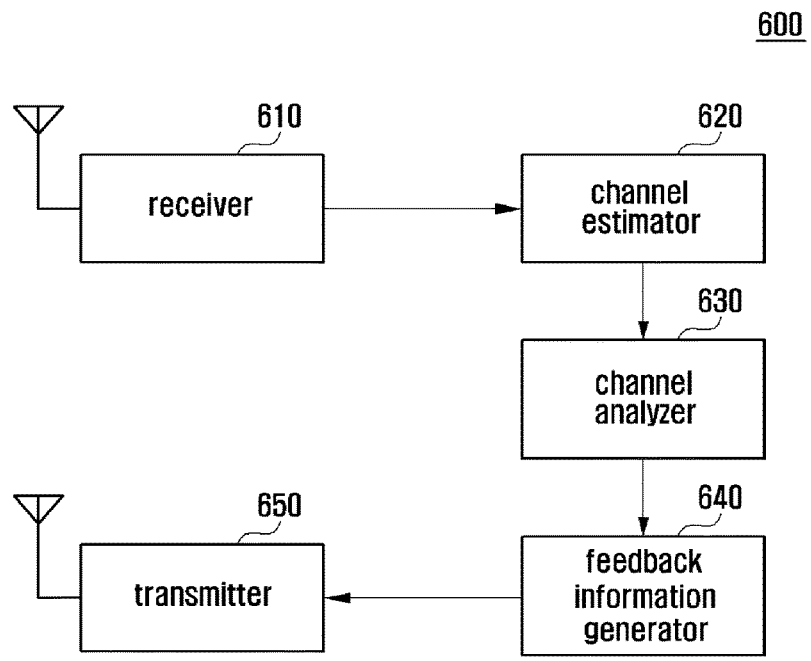
FIG. 11 is a block diagram illustrating an internal configuration of the transmission apparatus for performing the feedback method according to the second embodiment of the present invention.

FIG. 11 is a block diagram illustrating an internal configuration of a transmission apparatus for performing the feedback method according to the second embodiment of the present invention. Here, the transmission apparatus can be implemented as a part of the terminal.

Referring to FIG. 11, the transmission apparatus 600 includes a receiver 610, a channel estimator 620, a channel analyzer 630, a feedback information generator 640, and a transmitter 650.

The receiver 610 receives the reference signals on the downlink channel. At this time, the receiver 610 receives the reference signals from the base station 10. The channel estimator 620 estimates the downlink channel base on the reference signals. The channel analyzer 630 analyzes the downlink channels and selects at least two transmission schemes and the RI, subband CQI/PMI, and wideband CQI/PMI per transmission scheme. The feedback information generator 640 generates the channel status information according to the downlink channel analysis result. At this time, the feedback information generator 640 combines the rank informations for the individual transmission schemes to generate the RI for one of the transmission schemes. The transmitter 650 feeds back the channel status information on the uplink channel. That is, the transmitter 650 transmits the channel status information for the individual transmission schemes to the base station 10 under the control of the feedback information generator 640. At this time, the transmitter 650 transmits a combined RI corresponding to one of the transmission schemes without transmission of separate RIs for other transmission schemes. Here, the transmitter 650 can transmit the channel status information as depicted in one of FIGS. 6 to 10.

Figure 12:
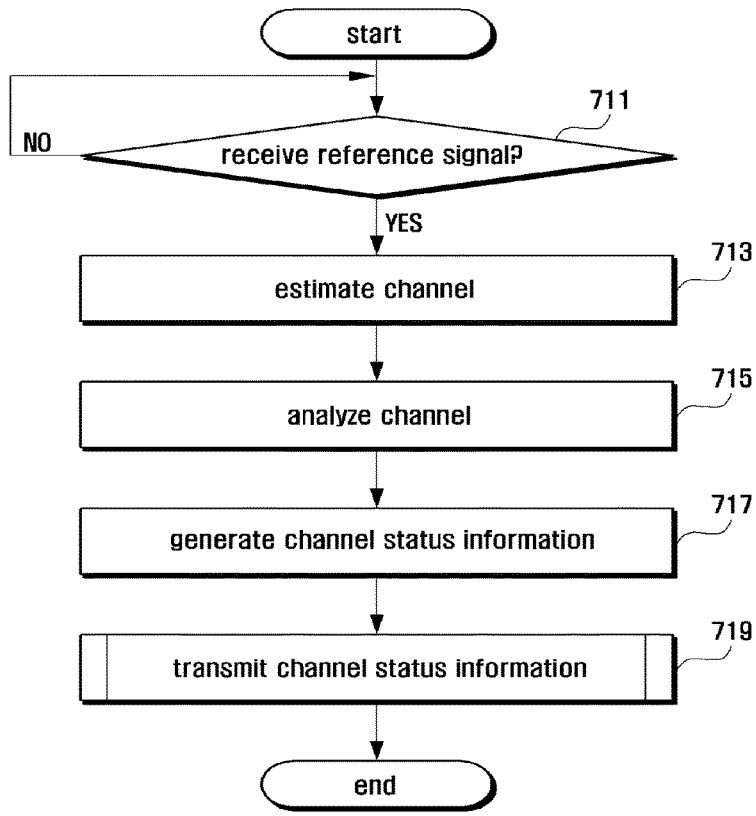
FIG. 12 is a flowchart illustrating an operation procedure of the transmission apparatus for the feedback method according to the second embodiment of the present invention.

FIG. 12 is a flowchart illustrating the operation procedure of the transmission apparatus for the feedback method according to the second embodiment of the present invention.

Referring to FIG. 12, when the terminal 20 receives the reference signal (RS) transmitted by the base station 10, the transmission apparatus 600 detects the receipt of the reference signal at step 711 and estimates downlink channel using the reference signal at step 713. Next, the transmission apparatus 600 analyzes the downlink channel to measure the status of the downlink channel at step S715. At this time, the transmission apparatus 600 selects at least two transmission schemes and the RI, subband CQI/PMI, and wideband CQI/PMI per transmission scheme. Next, the transmission apparatus 600 generates the channel status information according to the downlink channel analysis result at step S717. At this time, the transmission apparatus 600 combines the rank informations corresponding to individual transmission schemes to generate the RI for one of the transmission schemes. Next, the transmission apparatus 600 transmits the channel status information on the uplink channel at step 719. That is, the transmitter 600 feeds back the channel status information for each transmission scheme to the base station 10. At this time, the transmission apparatus 600 transmits a combined RI corresponding to one of the transmission schemes without separate transmission of the RIs for the rest transmission schemes. The channel status information transmission procedure of the transmission apparatus 600 is described hereinafter.

Figure 13:
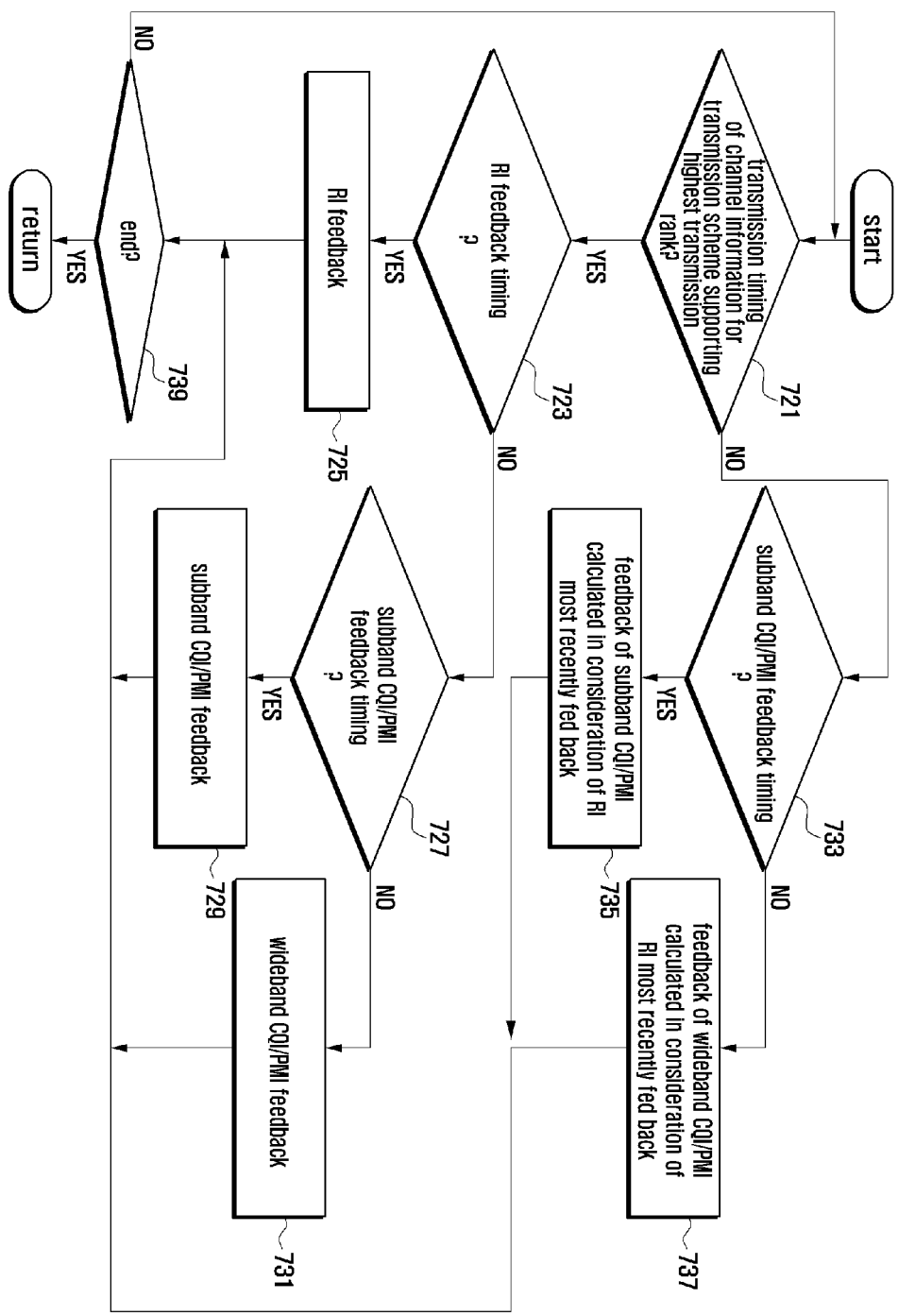
FIG. 13 is a flowchart illustrating channel status information transmission process in FIG. 12.

FIG. 13 is a flowchart illustrating a channel status information transmission procedure of FIG. 12.

Referring to FIG. 13, in order to transmit the channel status information, the transmission apparatus 600 compares maximum transmission ranks of at least two transmission schemes and checks whether it is the timing to feed back the channel status information for the transmission scheme having the highest transmission rank at step 721.

If it is the timing for transmission of the channel status information for the transmission scheme having the highest maximum transmission rank, the transmission apparatus 600 checks whether it is a timing for feedback of the RI at step 723. If it is the timing for feedback of the RI, the transmission apparatus 600 feeds back the RI at step 725. Otherwise if it is not the timing for the feedback of the RI at step 723, the transmission apparatus 600 checks whether it is a timing for feedback of the subband CQI/PMI at step S727. If it is the timing for the feedback of the subband CQI/PMI at step 727, the transmission apparatus 600 feeds back the subband CQI/PMI at step S729. Otherwise if it is not the timing for the feedback of the subband CQI/PMI at step 727, the transmission apparatus 600 feeds back the wideband CQI/PMI at step 831.

Meanwhile, if it is not the timing for the feedback of the channel status information for the transmission scheme having the highest maximum transmission rank at step 721, the transmission apparatus 600 checks whether it is a timing for feedback of subband CQI/PMI at step 733. If it is the timing for the feedback of the subband CQI/PMI at step 733, the transmission apparatus 600 feeds back the subband CQI/PMI based on the rank information determined based on the RI most recently fed back for the transmission scheme according to the above-described method. That is, the transmission apparatus 600 feeds back the subband CQI/PMI for the transmission scheme of which maximum transmission rank is not the highest one using the RI most recently fed back. If it is not the timing of the feedback of the subband CQI/PMI at step 733, the transmission apparatus 600 feeds back the wideband CQI/PMI based on the rank information determined with the RI most recently fed back for the transmission scheme feeding back the RI at step 5737. That is, the transmission apparatus 600 feeds back the wideband CQI/PMI for the transmission scheme of which maximum transmission rank is not the highest one using the RI most recently fed back for the transmission scheme feeding back the RI.

Figure 14:
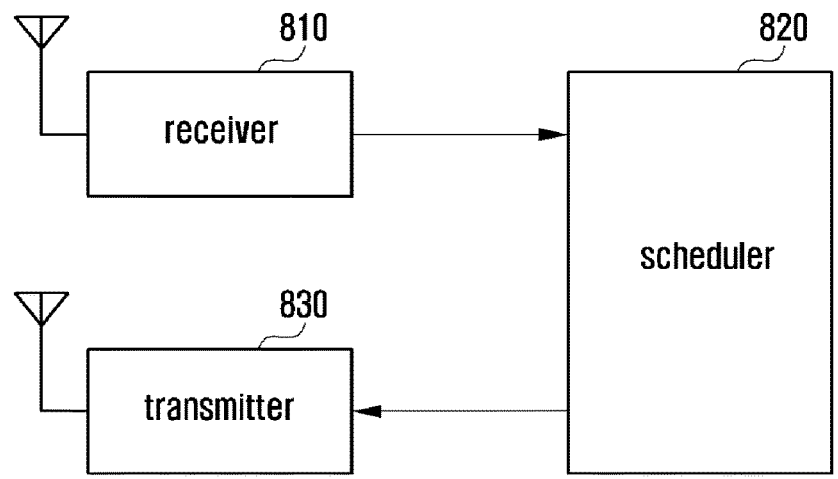
FIG. 14 is a block diagram illustrating and internal configuration of the transmission apparatus for performing the feedback method according to the second embodiment of the present invention.

FIG. 14 is a block diagram illustrating internal configuration of a reception apparatus for performing the feedback method according to the second embodiment of the present invention. At this time, the reception apparatus can be implemented as a part of the base station.

Referring to FIG. 14, the reception apparatus 800 according to this embodiment includes a receiver 810, a scheduler 820, and a transmitter 830.

The receiver 810 receives the channel status information on the uplink channel. That is, the receiver 810 receives the channel status informations corresponding to at least two transmission schemes. At this time, the receiver 810 receives the combined rank information for one of the transmission schemes. The scheduler 820 performs scheduling with the channel status information. At this time, the scheduler 820 calculates the rank per transmission scheme with the combined rank information for the transmission schemes. The scheduler 820 can select appropriate modulation and coding scheme according to the channel status information and perform scheduling based on the modulation coding scheme. The transmitter 830 transmits the data on the downlink channel. That is, the transmitter 830 transmits the data as scheduled by the scheduler 820.

Figure 15:
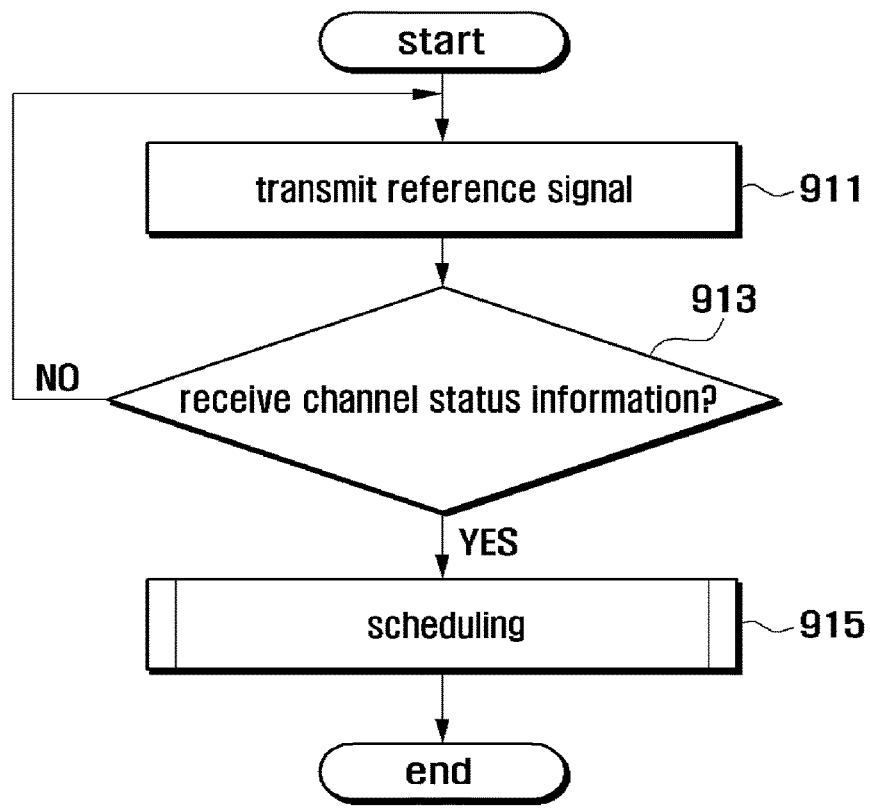
FIG. 15 is a flowchart illustrating the operation procedure of the reception apparatus for the feedback method according to the second embodiment of the present invention.

FIG. 15 is a flowchart illustrating operation procedure of the reception apparatus for the feedback method according to the second embodiment of the present invention.

Referring to FIG. 15, the transmission apparatus 800 transmits the reference signal on the downlink channel at step 911. The transmission apparatus 800 transmits the reference signals as scheduled based on the channel status information received previously from the terminal 20. At this time, the reference signals are transmitted on the downlink channel. Here, the reception apparatus 800 can further transmit data on the downlink channel as scheduled. If the channel status information is received on the uplink channel, the reception apparatus 800 detects the receipt of the channel status information at step 913 and performs scheduling according to the channel status information at step 915. At this time, the reception apparatus 800 can receive the channel status information corresponding to at least two transmission schemes from the terminal 20. Here, the reception apparatus 800 receives the rank information combined for the transmission schemes. Next, the reception apparatus 800 calculates the rank per transmission scheme using the combined rank information for the transmission schemes to determine the transmission scheme to be applied for the downlink channel. That is, the reception apparatus 800 selects an appropriate modulation and coding scheme according to the channel status information. The reception apparatus 800 also performs scheduling on the downlink channel according to the transmission scheme. The scheduling procedure of the reception apparatus 800 is described in more detail hereinafter.

Figure 16:
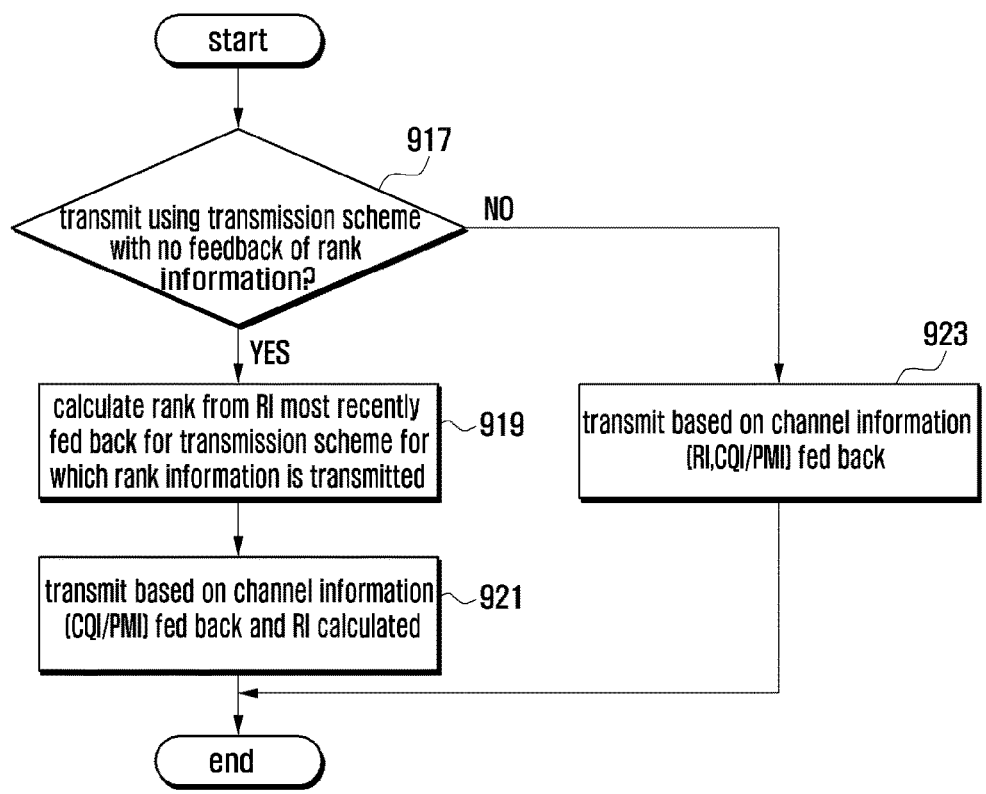
FIG. 16 is a flowchart illustrating the scheduling execution process in FIG. 15.

FIG. 16 is a flowchart illustrating a scheduling procedure of FIG. 15.

Referring to FIG. 16, in order to perform scheduling, the reception apparatus 800 determines whether to perform transmission using the transmission scheme for which no rank information is fed back at step 917. If it is determined to use the transmission scheme for which no rank information is fed back at step 917, the reception apparatus 800 calculates the rank using the RI most recently fed back for the transmission scheme at step 919. Next, the reception apparatus 800 performs scheduling based on the channel status information fed back, i.e., the CQI/PMI and the calculated rank, at step 921. Otherwise if it is determined to not use the transmission scheme for which no rank information is fed back at step 917, the reception apparatus 800 performs scheduling at step 923 based on the channel status information, i.e. RI and CQI/PMP, fed back.

In the mobile communication system according to the present invention, the terminal 20 feeds back the rank informations for multiple transmission schemes in combined manner so as to reduce the overhead at the base station 10. That is, the channel status information overhead can be mitigated at the base station 10.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A method for transmitting channel status information of a terminal in a wireless communication system, the method comprising:

identifying rank information for a first transmission scheme;
transmitting, to a base station, the identified rank information for the first transmission scheme;
identifying rank information for a second transmission scheme based on the rank information for the first transmission scheme;
generating channel status information for the second transmission scheme based on the identified rank information for the second transmission scheme; and
transmitting, to the base station, the generated channel status information for the second transmission scheme,
wherein identifying rank information for the second transmission scheme comprises:
identifying, if a highest value of supportable rank for the first transmission scheme is greater than a highest value of supportable rank for the second transmission scheme, the rank information for the second transmission scheme based on the rank information for the first transmission scheme.

2. The method of claim 1, wherein the channel status information for the second transmission scheme comprises at least one of channel quality indicator (CQI) and precoding matrix indicator (PMI) for the second transmission scheme identified based on the identified rank information for the second transmission scheme, and
transmitting the channel status information comprises
transmitting at least one of CQI and PMI for the second transmission scheme through the second transmission scheme.

3. A method for receiving channel status information of a base station in a wireless communication system, the method comprising:

receiving, from a terminal, rank information for a first transmission scheme;
receiving, from the terminal, channel status information (CSI) for the second transmission scheme; and
scheduling a downlink channel related to the second transmission scheme based on the received CSI,
wherein rank information for the second transmission scheme is identified based on the rank information for the first transmission scheme, if a highest value of supportable rank for the first transmission scheme is greater than a highest value of supportable rank for the second transmission scheme, and
wherein the CSI for the second transmission is generated based on the identified rank information for the second transmission scheme.

4. The method of claim 3, wherein scheduling the downlink channel comprises:
scheduling the downlink channel related to the second transmission scheme based on a calculated rank calculated based on the rank information for the first transmission scheme.

5. The method of claim 4, wherein scheduling a downlink channel comprises:
scheduling the downlink channel related to the second transmission scheme by checking a rank of one of the first transmission scheme and second transmission scheme based on the rank information for the first transmission scheme.

6. The method of claim 3, wherein the calculated rank information is determined based on a highest value of supportable rank of the second transmission scheme.

7. The method of claim 3, wherein the channel status information for the second transmission scheme comprises at least one of channel quality indicator (CQI) and precoding matrix indicator (PMI) for the second transmission scheme identified based on the rank information for the first transmission scheme, and receiving the channel status information comprises receiving at least one of CQI and PMI for the second transmission scheme through the second transmission scheme.

8. transmission apparatus of a terminal comprising:
a transceiver for transmitting and receiving a signal; and
a controller configured to:
identify rank information for a first transmission scheme,
transmit, to a base station, the identified rank information for the first transmission scheme,
identify rank information for a second transmission scheme based on the rank information for the first transmission scheme,
generate channel information for the second transmission scheme based on the identified rank information for the second transmission scheme, and
transmit, to the base station, the generated channel status information for the second transmission scheme,
wherein the controller is further configured to identify, if a highest value of supportable rank for the first transmission scheme is greater than a highest value of supportable rank for the second transmission scheme, the rank information for the second transmission scheme based on the rank information for the first transmission scheme.

9. The transmission apparatus of claim 8, wherein the channel status information for the second transmission scheme comprises at least one of channel quality indicator (CQI) and precoding matrix indicator (PMI) corresponding to the second transmission scheme identified based on the identified rank information for the second transmission scheme, and wherein the controller is further configured to transmit the rank information for the first transmission scheme through the first transmission scheme and to transmit at least one of the CQI and PMI for the second transmission scheme through the second transmission scheme.

10. A reception apparatus of a base station comprising:
a transceiver for transmitting and receiving a signal; and
a controller is configured to:
receive, from a terminal, rank information for a first transmission scheme,
receive, from the terminal, channel status information (CSI) for the second transmission scheme, and
schedule a downlink channel related to the second transmission scheme based on the received CSI,
wherein rank information for the second transmission scheme is identified based on the rank information for the first transmission scheme, if a highest value of supportable rank for the first transmission scheme is greater than a highest value of supportable rank for the second transmission scheme, and
wherein the CSI for the second transmission is generated based on the identified rank information for the second transmission scheme.

11. The reception apparatus of claim 10, wherein the controller is further configured to schedule the downlink channel related to the second transmission scheme based on a calculated rank calculated based on the rank information for the first transmission scheme.

12. The reception apparatus of claim 11, wherein the calculated rank is determined based on a highest value of supportable rank of the second transmission scheme.

13. The reception apparatus of claim 10, wherein the channel status information for the second transmission scheme comprises at least one of channel quality indicator (CQI) and precoding matrix indicator (PMI) for the second transmission scheme identified based on the rank information for the first transmission scheme, and the controller is further configured to receive at least one of CQI and PMI for the second transmission scheme through the second transmission scheme.

* * * * *